(12) United States Patent
Mori

(10) Patent No.: US 7,111,993 B2
(45) Date of Patent: Sep. 26, 2006

(54) OPTICAL MONITOR MODULE

(75) Inventor: Keiichi Mori, Tokyo (JP)

(73) Assignee: Japan Aviation Electronics Industry Limitedc, Tokyo (JP)

( * ) Notice: Subject to any disclaimer, the term of this patent is extended or adjusted under 35 U.S.C. 154(b) by 0 days.

(21) Appl. No.: 10/803,359

(22) Filed: Mar. 18, 2004

(65) Prior Publication Data

US 2004/0190833 A1 Sep. 30, 2004

(30) Foreign Application Priority Data

Mar. 27, 2003 (JP) ............... 2003-087863

(51) Int. Cl.
*G02B 6/36* (2006.01)
*G02B 6/255* (2006.01)

(52) U.S. Cl. .............. 385/88; 385/91; 385/93; 385/39; 250/227.11

(58) Field of Classification Search ............... 385/88, 385/91, 93, 39
See application file for complete search history.

(56) References Cited

U.S. PATENT DOCUMENTS

| | | | |
|---|---|---|---|
| 4,701,011 A | | 10/1987 | Emkey et al. |
| 5,859,940 A | * | 1/1999 | Takahashi et al. ............ 385/34 |
| 6,014,483 A | * | 1/2000 | Thual et al. ................. 385/33 |
| 6,361,222 B1 | * | 3/2002 | Kawaguchi et al. .......... 385/88 |
| 6,654,517 B1 | * | 11/2003 | Fairchild et al. ............. 385/33 |
| 6,873,768 B1 | * | 3/2005 | Duelli et al. ................. 385/50 |
| 2003/0002809 A1 | * | 1/2003 | Jian ............................. 385/73 |

FOREIGN PATENT DOCUMENTS

| | | |
|---|---|---|
| EP | 0 903 607 | 3/1999 |
| EP | 1 014 125 | 6/2000 |
| JP | 06347665 | 12/1994 |
| JP | 08-094887 | 4/1996 |
| JP | 08271752 | 10/1996 |
| JP | 10-239558 | 9/1998 |
| JP | 10-253848 | 9/1998 |
| JP | 11-305054 | 11/1999 |
| JP | 2000-047067 | 2/2000 |
| JP | 2000-338359 | 12/2000 |
| JP | 2001-183543 | 7/2001 |
| JP | 2001358362 | 12/2001 |

* cited by examiner

*Primary Examiner*—Frank G. Font
*Assistant Examiner*—Erin D. Chiem
(74) *Attorney, Agent, or Firm*—David N. Lathrop, Esq.; Gallagher & Lathrop

(57) ABSTRACT

In one half portion of one surface of a substrate there are formed in parallel V-grooves of the same depth, in which optical fibers and are disposed and positioned with their axes held at a height H1 with respect to the surface. The optical fibers and have lens portions formed integrally therewith at one end, and the end faces of the lens portions are tilted at an angle θ' from their axes. A beam splitter is mounted on the substrate on a center line between elongations of the optical fibers, and light emitted from the lens portion propagates through space and is launched in focused form into the beam splitter, and a portion of the incident light is reflected, which propagates space and is launched in focused form into the lens portion and propagates through the optical fiber. The light having passed through the beam splitter is launched into a light receiving element. By monitoring an electrical signal that is output from the light receiving element, it is possible to monitor the light propagating through the optical fiber.

8 Claims, 3 Drawing Sheets

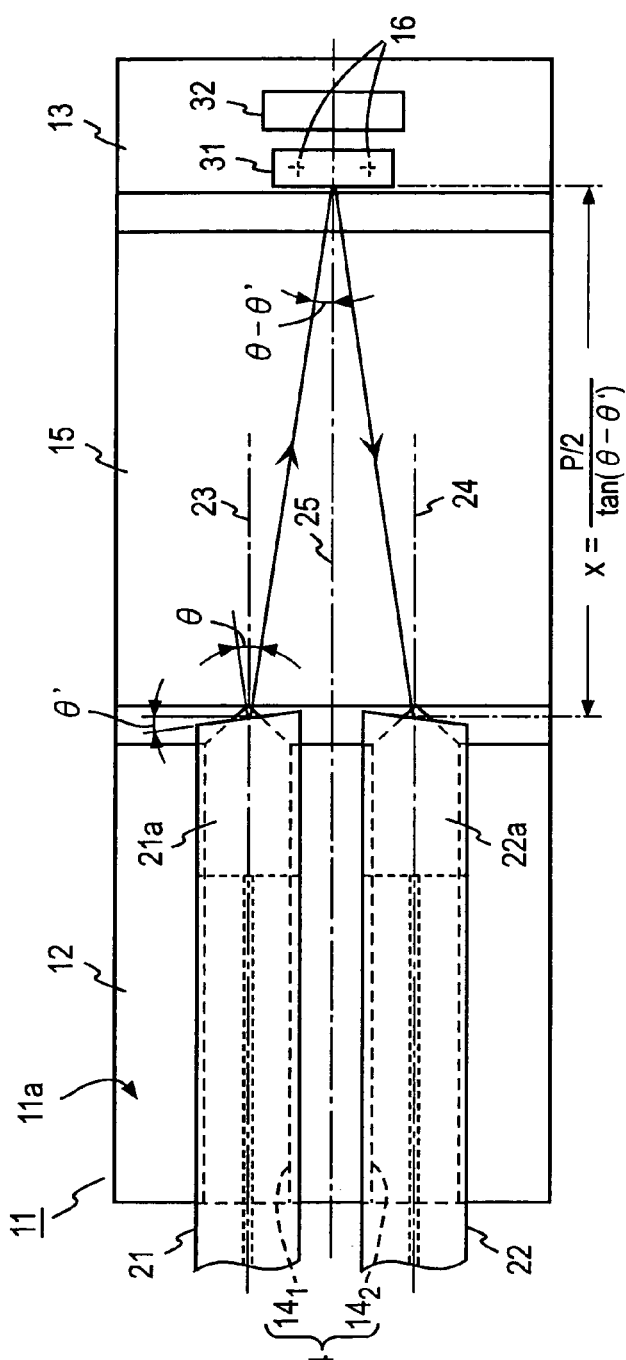
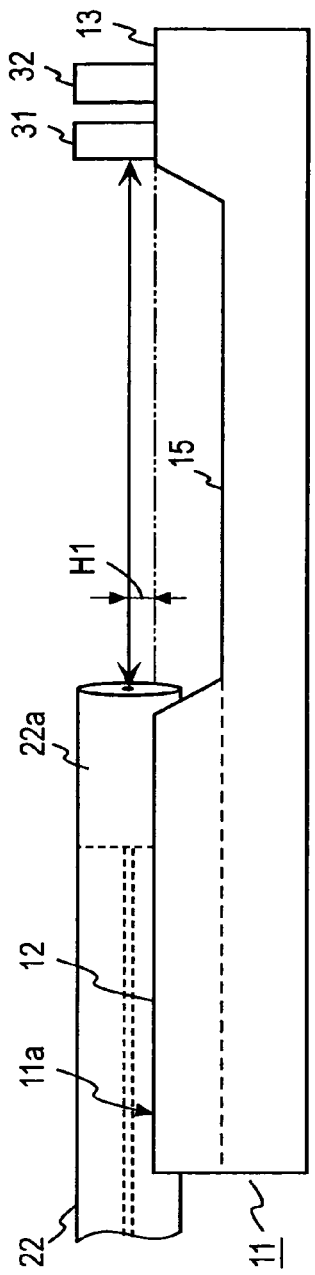
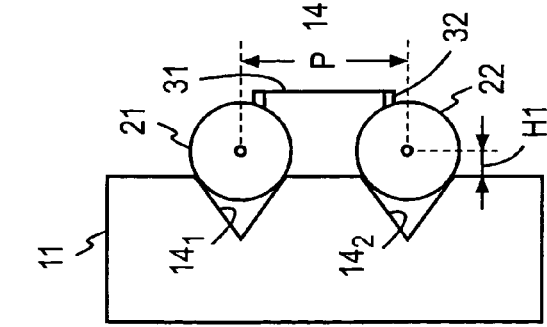

OPTICAL MONITOR MODULE

BACKGROUND OF THE INVENTION

The present invention relates to an optical monitor module that launches a portion of light emitted from an optical fiber into another optical fiber for propagation therethrough to a monitoring part.

In a conventional optical monitor module, light emitted from an optical fiber is launched into an optical waveguide on an optical waveguide substrate having formed thereon an optical branching circuit, and light branched by the optical branching circuit is emitted from the optical waveguide substrate for incidence on a monitoring section. This prior art is disclosed, for instance, in Japanese Patent Application Kokai Publications Nos. 2001-358362 and 347665/94.

With such a conventional type of optical monitor module which monitors the light branched by the branching circuit of the optical waveguide formed on the optical waveguide substrate, light of relatively large power needs to be branched for monitoring because of a propagation loss by the optical waveguide. Further, the optical branching circuit has a Y-branch configuration and the two optical waveguides are formed substantially at right angles to each other—this leads to the defect of relatively much space being occupied by the optical waveguide substrate. One possible solution to this problem is an optical module configuration in which no branching circuit of the optical waveguide is used but instead light emitted from an optical fiber is launched into a beam splitter through space and light transmitted through or reflected by the beam splitter is launched into another optical fiber for propagation to the monitoring part. This module structure does not suffer a loss of light resulting from the propagation through the optical waveguide, but since the optical fibers and the beam splitter are spaced relatively wide apart, the light beam diverges (that is, the beam diameter increases), resulting in an increase in the light loss. Further, the two optical fibers are disposed substantially at right angles to each other, occupying much space.

SUMMARY OF THE INVENTION

It is therefore an object of the present invention to provide an optical monitor module of low light loss and low space occupancy.

According to the present invention, a substrate has in its one surface a positioning structure, by which first and second optical fibers are mounted in parallel on the substrate surface with their positions defined in a direction perpendicular to the substrate surface and in the direction of their side-by-side arrangement. The first and second optical fibers each have a lens portion formed integrally therewith at the same end, and the lens portion is configured such that light incident on and light emitted from its end face is aslant to the axis of the lens section. A beam splitter or optical filter is mounted on the substrate at a position intermediate between elongations of the lens sections of the first and second optical fibers. The light emitted from the first optical fiber propagates through space and impinges on the beam splitter or optical filter, and the incident light is partly transmitted through the beam splitter or optical filter and partly reflected therefrom, and the reflected light propagates through space and strikes on the second optical fiber.

Since the optical paths between the first and second optical fibers and the beam splitter or optical filter are space, no light loss is produced, and no divergence of light beam occurs under the light-gathering action of the lens portion formed as an integral part of each optical fiber at one end thereof. Further, since the first and second optical fibers are disposed in parallel relation, the optical monitor module of the present invention does not require large two-dimensional space.

BRIEF DESCRIPTION OF THE DRAWINGS

FIG. 1A is a plan view illustrating an embodiment of the present invention;

FIG. 1B is its left-side view;

FIG. 1C is its front view;

DETAILED DESCRIPTION OF THE PREFERRED EMBODIMENTS

Figure 2:
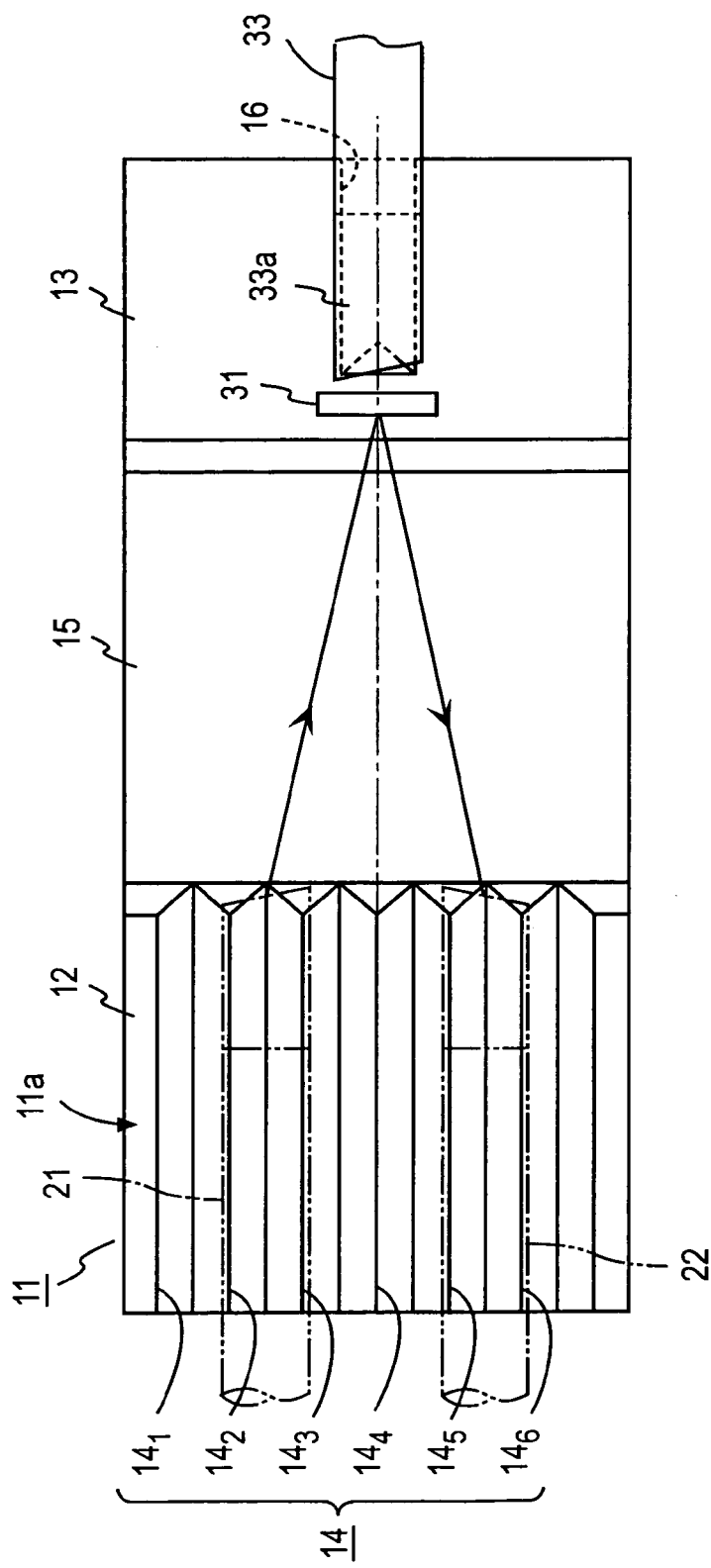
FIG. 2 is a plan view illustrating another embodiment of the present invention.

Referring first to FIG. 1, an embodiment will be described below. On one surface 11a of a substrate 11 there are formed a fiber mounting part 12 and a parts mounting part 13 in spaced relation to each other, and the fiber mounting part 12 has a positioning structure 14 for positioning a plurality of optical fibers so that they extend in parallel relation and in the direction in which the fiber mounting part 12 and the parts mounting part 13 are disposed opposite to each other. The positioning structure 14 is to position the optical fibers in a direction perpendicular to the surface 11a of the substrate 11 and in the direction in which the optical fibers are arranged side by side. On the fiber mounting part 12 there are mounted the optical fibers 21 and 22 positioned at one end by the positioning structure 14. On the parts mounting part 13 there is mounted a beam splitter or optical filter 31 at a position intermediate between elongations 23 and 24 of the optical fibers 21 and 22. For convenience the beam splitter or optical filter 31 will hereinafter be described simply as the "beam splitter" 31.

The optical fibers 21 and 22 have lens portions 21a and 22a of the same diameter as that of the optical fibers formed integrally therewith at their ends in opposing relation to the beam splitter 31, and the lens portions 21a and 22a are configured such that light enters and leaves them at an angle to their axes. The light having propagated through the optical fiber 21 emanates therefrom at an angle to its axis, then propagates through space, and impinges in focused form on the beam splitter 31, by which a portion of the incident light is reflected, and the reflected light strikes on the lens portion 22a of the optical fiber 22 after propagating through space.

The respective parts of the illustrated optical monitor module will be described in greater detail. The substrate 11 is a rectangular substrate as of single-crystal silicon, one half portion of which forms the fiber mounting part 12 and the other end portion of which forms the parts mounting part 13. The fiber mounting part 12 has cut therein by anisotropic etching two parallel V-grooves $14_1$ and $14_2$ of the same depth extending in the direction of arrangement of the fiber mounting part 12 and the parts mounting part 13. In this embodiment the portion intermediate between the fiber mounting part 12 and the parts mounting part 13 is also subjected to the anisotropic etching to form a concavity 15. The ends of the V-grooves $14_1$ and $14_2$ on the side thereof opposite the parts mounting part 13 are open to the outside to permit leading the optical fibers 21 and 22 off the substrate 11 without bending them.

The end portions of the optical fibers 21 and 22 are disposed in the V-grooves $14_1$ and $14_2$ and fixedly bonded thereto by an adhesive, for instance. On this occasion, the height H1 of the core of each of the optical fibers 21 and 22 with respect o the surface 11a of the substrate 11 is determined, that is, the position of each optical fiber in the direction perpendicular to the substrate surface 11a is determined. Further, the core spacing P is determined, and the position of each optical fiber on the substrate surface 11a in a direction perpendicular to the direction of arrangement of the both mounting parts 12 and 13 is determined. And the optical fibers 21 and 22 extend in parallel to each other.

The lens portions 21a and 22a of the optical fibers 21 and 22 are each formed, for example, by a silica section and a graded-index multimode fiber section as described in U.S. Pat. No. 6,014,483 (issued Jan. 11, 2000). In the FIG. 1 embodiment the end face of each lens portion is slightly angled relatively to a plane perpendicular to the axis of the lens portion. This can be done, for example, by techniques for sloping an end face of an optical fiber by grinding with a view to preventing that light emitted from the optical fiber is reflected back thereinto. Since the end faces of the lens portions 21a and 22a are thus sloped, light impinges on each lens portion at an angle to the axis of the optical fiber. In this example the lens portions 21a and 22a are common in the inclination angle $\theta'$ to the axes of the optical fibers 21 and 22.

In the illustrated embodiment the beam splitter 31 is disposed on a line 25 centrally between the elongations 23 and 24 of the optical fibers 21 and 22 with its light receiving and emitting face held perpendicular to the center line 25. For example, on the parts mounting part 13 a pair of markers 16 are formed opposite across the center line 25 equidistantly therefrom, then the beam splitter 31 is disposed on the markers 16 to positions the beam splitter 31 on the substrate surface 11a and in the direction perpendicular thereto. In this instance, it is desirable that the distance x from the lens portions 21a and 22b to the beam splitter 31 along the center line 25 and their positions in the direction of elongation of the center line 25 be highly accurate, but positioning accuracy in the other directions need not be so high. The markers 16 can be formed easily and accurately, for example, by metal films through photolithography and etching at the same time as the V-grooves $14_1$ and $14_2$ are formed through photolithography and subsequent etching. The beam splitter 31 is mounted on the parts mounting part 13 by positioning the both markers 16 and both end portions of the bottom of the beam splitter 31 relative to each other through use of a microscope as in flip-chip bonding, then bringing them into contact with each other, and soldering them to each other. In this example, a photodiode or similar light receiving element is mounted as an optical part 23 behind the beam splitter 31 on the parts mounting part 13.

The distance x between the lens portions 21a and 22a of the optical fibers 21 and 22 and the beam splitter 31 along the center line 25 is chosen as described below so that the directions of incidence of light on and emittance of light from the lens portions 21a and 22a cross at the position of the beam splitter 31. That is, the distance x is so set as to obtain the following relation in a plane parallel to to substrate surface 11a. Letting the refractive indexes of the lens portions 21a and 22a be represented by n', the refractive index of the optical path medium between the lens portions 21a and 22a and the beam splitter 31 by n and the inclination angles of the end faces of the lens portions 21a and 22a with respect to the planes perpendicular to the axes of the optical fibers by $\theta'$, the angle $\theta$ of the direction of incidence on and emittance from the lens portions 21a and 22a to the direction perpendicular to their end faces is given as follows:

$$\theta = \sin^{-1}(n' \sin \theta'/n) \quad (1)$$

Assuming that the directions of incidence on and emittance from the both lens portions 21a and 22a cross on the center line 25, the angle of intersection of the center line 25 and the direction of incidence on and emittance from each of the lens portions 21a and 22a is $(\theta-\theta')$. Therefore, letting the spacing between the cores of the optical fibers 21 and 22 be represented by P, the distance x is given as follows:

$$x = P/(2 \tan(\theta-\theta')) \quad (2)$$

Letting P=250 μm, $\theta'=6°$ and n'=1.5, since the optical paths between the lens portions 21a and 22a and the beam splitter 31 are space (air), n=1, and hence $\theta=9°$ and x≈2.4 mm. The optical fibers 21 and 22 are positioned in the V-grooves $14_1$ and $14_2$ with respect to the beam splitter 31 while measuring the distance between them. The angular positions of the end faces of the lens portions 21a and 22a about the axes of the optical fibers 21 and 22 are determined while monitoring the inclination of the end faces of the lens portions 21a and 22a through their images. Alternatively, markers are attached to the peripheral portions of the forward ends of the lens portions 21a and 22a, and the angular positions of the end faces of the lens portions 21a and 22a about the axes of the optical fibers 21 and 22 are determined so that the markers are right above looking from the direction perpendicular to the substrate surface 11a and that the end faces of the lens portions 21a and 22a slope in opposite directions with respect to the center line 25. Further, it is desirable to launch light into, for example, the optical fiber 21 and determine the positions of the optical fibers 21 and 22 lengthwise thereof and their angular positions about the fiber axes so that light emitted from the optical fiber 22 becomes maximum. The intermediate portion of the beam splitter 31 in the direction perpendicular to the substrate surface 11a is held at substantially the same height as that H1 of the axes of the optical fibers 21 and 22 with respect to the substrate surface 11a, and the intermediate portion of the beam splitter 31 in the direction of arrangement of the optical fibers 21 and 22 is held on the center line 25.

With the structure described above, the light having propagated through the optical fiber 21 is refracted by the lens portion 21a when it is emitted therefrom, and the light emitted therefrom propagates through space and is focused onto the beam splitter 31. The light incident on the beam splitter 31 is branched into transmitted light and reflected light, and the transmitted light is launched into an optical part, that is, the light receiving element 32 in this example, by which it is converted to an electrical signal. The reflected light from the beam splitter 31 passes through space, then strikes on the lens portion 22a and propagates through the optical fiber 22, thereafter being emitted therefrom. At this time, it is possible to monitor the light propagating through the optical fiber 22 by monitoring the electrical signal that is output from the light receiving element 32.

The axes of the optical fibers 21 and 22 are in the same plane parallel to the substrate surface 11a, and the refraction of light when it is emitted from the lens portion 21a of the optical fiber 21 and the refraction of light when it impinges on the lens portion 22a of the optical fiber 22 take place in the above-mentioned same plane. Furthermore, since the positions of the lens portions 22a and 22b and the angular positions of their end faces about their axes bear the relationship that satisfies the conditions by Eqs. (1) and (2), the light emitted from the lens portion 21a and reflected by the beam splitter 31 correctly impinges on the end face of the lens portion 22a centrally thereof, and since the optical paths between the lens portions 21a and 22a and the beam splitter 31 are space (air), the propagation loss by air is negligibly small as compared with that by an optical waveguide, and the light-gathering actions of the lens portions 21a and 22a prevent the divergence of light, ensuring that the overall light loss is remarkably small. Since the propagation path is air, there is no deterioration of polarization characteristics of light that is caused by its propagation through the optical waveguide—this provides for improved optical characteristics of the optical monitor module. Moreover, since no waveguide substrate for optical waveguides is needed, the number of parts used is small.

It is preferable that the beam diameter of the light emitted from the lens portion 21a of the optical fiber 21 be minimized at the position of the beam splitter 31. The optical path length between the lens portion 21a and the beam splitter 31, which fulfills such requirement, can be achieved by using the spacing P and the inclination angle θ' of the end face of the lens portion 21a in Eqs. (1) and (2). This also applies to the path length between the lens portion 22a and the beam splitter 31.

The beam splitter 31 may be a beam splitter in a narrow sense which has no wavelength selectivity, that is, a beam splitter that selectively passes therethrough and reflects wavelength components of the incident light according to their wavelength, or it may also be an optical filter, that is, a beam splitter having wavelength selectivity that passes therethrough or reflects a particular wavelength (or band including it) component of the incident light and reflects or passes the other wavelength component. The light transmitted through the beam splitter 31 may be propagated to a monitor section for monitoring the light having propagated through the optical fiber 21. In this instance, an optical fiber is used as the optical part 32, over which the light transmitted through the beam splitter 31 is sent to the monitor section.

FIG. 2 is a plan view of another embodiment of the present invention. In this embodiment there are formed in the substrate surface 11a three or more parallel V-grooves; in FIG. 2 six V-grooves $14_1, 14_2, \ldots, 14_6$ of the same depth are formed in parallel.

According to the optical monitor module required, the situation may sometimes arise where it is desirable to lengthen or shorten the distance between the optical fibers 21 and 22 and the beam splitter 31, or where it is desirable to displace the beam splitter 31 in the direction of arrangement of the optical fibers 21 and 22. In such a case, two V-grooves, in FIG. 2, $14_2$ and $14_5$, are selected to comply with the request and the optical fibers 21 and 22 are mounted in the two selected V-grooves. According to the type of beam splitter 31 actually used, the angles of incidence of light thereon and reflection therefrom may preferably be set at particular values. In such an instance, two grooves are selected so that the directions of incidence of light on and emittance from the lens portions 21a and 22a coincide with the preferred angles, respectively, and cross each other on the center line between the optical fibers 21 and 22. In this case, the inclination angles θ' of the lens portions 21a and 22a also need to be altered so that the directions of incidence of light thereon and reflection therefrom become as desired. With three or more V-grooves formed as mentioned above, the substrate 11 can be used in common to various requests.

FIG. 2 shows an example of using an optical fiber 33 as an optical part. The optical fiber 33 is also mounted in a groove formed, simultaneously with the formation of the V-grooves $14_1, \ldots, 14_6$, in the parts mounting part 13 of the substrate 11 to the same depth as those of the V-grooves $14_1, \ldots, 14_6$ and in parallel thereto. The optical fiber 33 is positioned in the direction perpendicular to the substrate surface 11a and in the direction of arrangement of the optical fibers 21 and 22. In this embodiment the optical fiber 33 has a lens portion 33a formed integrally therewith at one end. The inclination angle θ' of the end face of the lens portion 33a is made the same as the inclination angle θ' of the end face of each of lens portions 21a and 22a of the optical fibers 21 and 22, and angular position of the end face of the lens portion 33a about the axis of the optical fiber 33 is set so that the end face of the lens portion 33a is parallel to the end face of the lens portion 21a. The optical fiber 33 need not always be provided with the lens portion 33a. In such a case, however, the end face of the optical fiber 33 facing the beam splitter 31 is sloped so that the angle of refraction of light entering the optical fiber 33 from the beam splitter 31 coincides with the angle of refraction of light emitted from the lens portion 21a. The light having impinged on the optical fiber 33 may also be converted by a light receiving element to an electrical signal for monitoring the light propagated through the optical fiber 22.

The positioning structure 14 for the optical fibers 21 and 22 is not limited specifically to the V-grooves but they may be U-shaped. For example, as depicted in FIG. 3, U-sectioned grooves $14_1$ and $14_2$ of the same width are formed in parallel in the substrate surface 11a by dry etching with reactive ions. The optical fibers 21 and 22 are mounted in the U-sectioned grooves $14_1$ and $14_2$, respectively. The diameters of the optical fibers 21 and 22 are larger than the widths of the U-shaped grooves $14_1$ and $14_2$, and consequently, the optical fibers 21 and 22 are partly received in the grooves $14_1$ and $14_2$ and are not in contact with their bottoms 14a. The heights of the axes of the optical fibers 21 and 22 with respect to the substrate surface 11a are both H1, and the optical fibers 21 and 22 are positioned in the direction perpendicular to the substrate surface 11a. The optical fibers 21 and 22 are arranged in parallel to each other, and the spacing P between their axes becomes as predetermined, and the positions of the optical fibers 21 and 2 on the substrate surface 11 in the direction of their arrangement are determined. Accordingly, it will easily be understood that the optical monitor module of this embodiment produces the same operation/working-effect as does the FIG. 1 embodiment.

Figures 3A, 3B:
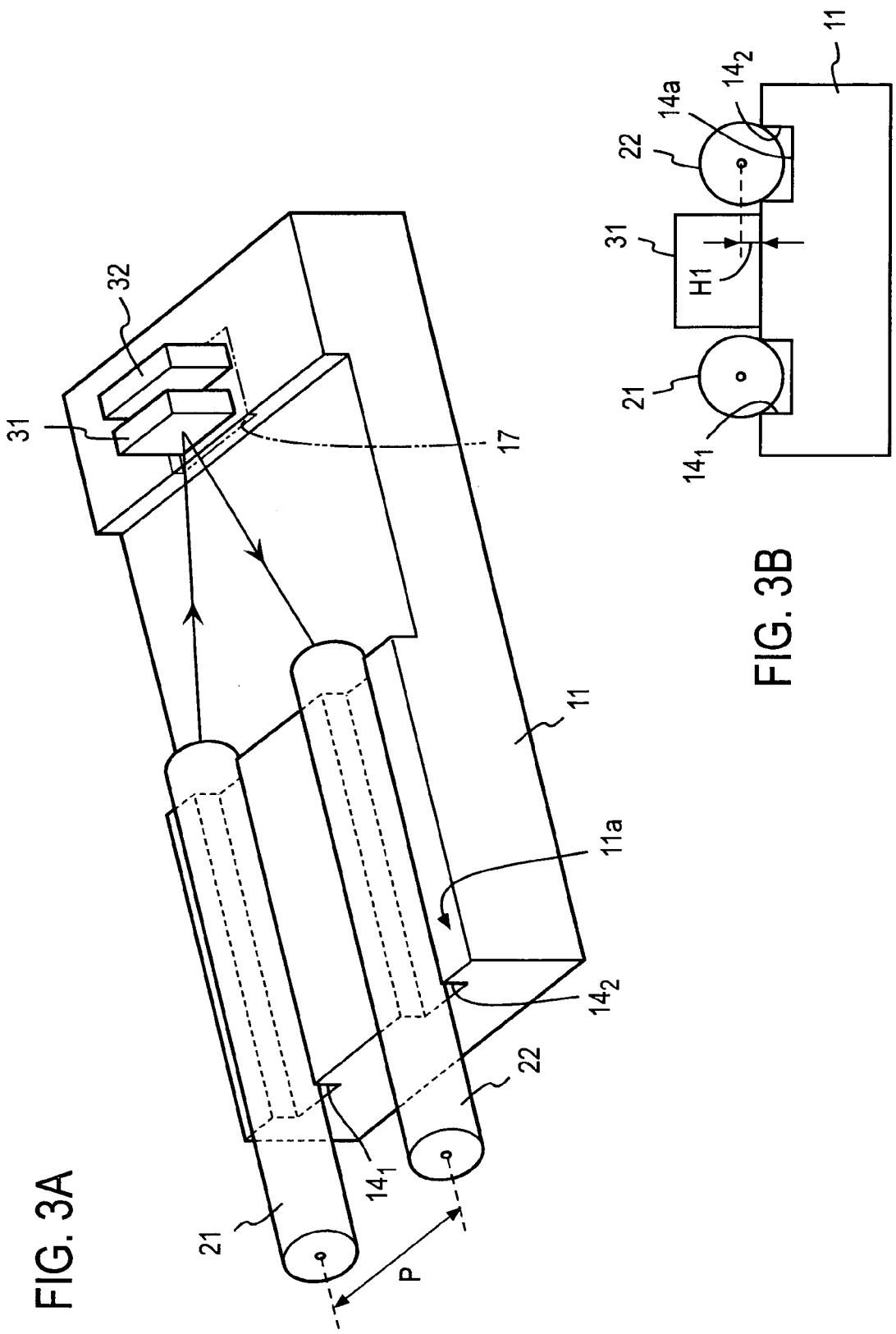
FIG. 3A is a plan view illustrating still another embodiment of the present invention.
FIG. 3B is its left-side view.

While in the above the inclination angles θ' of the end faces of the lens portions 21a and 22a of the optical fibers 21 and 22 have been described to be equal, they may also be made different. The substrate 11 may be formed using such materials as a single crystal of gallium arsenide (GaAs), crystal, glass, and synthetic resin. In the case of using the gallium arsenide and crystal, the V-grooves can be formed by wet etching through utilization of their crystal anisotropy. The grooves may be U-shaped. When the substrate is made of glass, the grooves can be formed by dry etching with reactive ions, and in the case of synthetic resin, they can be formed by molding. The directions of incidence of light on and emittance from the lens portions 21a and 22a can be tilted with respect to the axes of the optical fibers by sloping the end faces of the lens portions 21a and 22a. When the lens portions 21a and 22a of the optical fibers 21 and 22 are each formed, for example, by a silica section and a graded-index multimode fiber section as described in the afore-mentioned US Patent, the end faces of the lens portions 21 and 22a are not angled but held perpendicular to the axes of the optical fibers 21 and 22, and the center of the graded-index distribution needs only to be slightly displaced relative to the core of each of the optical fibers 21 and 11. In the embodiments described above, the optical paths between the lens portions 21a and 22a and the beam splitter 31 are located outside the substrate 11, but since the optical paths are so close to the substrate surface 11 that optical beams are likely to deviate from the optical paths and impinge on the surface 11, the concavity 15 is formed to avoid such accidental bombardment of the substrate 11 with the optical beams. When there is no such a fear, the concavity 15 need not be formed as indicated by the alternate long and short dashed line in FIG. 1C. In the case of using U-sectioned grooves as shown in FIG. 3, the optical fibers 21 and 22 may be positioned by bottoms and both side walls of the grooves. Irrespective of whether the grooves 141 and $14_2$ are V- or U-grooves, the points of incidence on and emittance from the lens portions 21a and 22a may be located further inside the substrate 11 than the substrate surface 11a. In this instance, the concavity 15 is formed, and a shallow depression 17 is formed in the substrate 11 as indicated in FIG. 3A so that the position where to mount the beam splitter 31 in the substrate surface 11a is also inside the substrate.

What is claimed is:

1. An optical monitor module comprising:
    a substrate having formed in one surface thereof a positioning structure for positioning a plurality of optical fibers in parallel and for determining positions of said optical fibers in a direction perpendicular to said one surface;
    first and second optical fibers mounted in parallel on said substrate by said positioning structure, said first optical fiber having an axis and a lens portion with a graded-index fiber formed integrally in one end of the first optical fiber for emitting light at an angle inclined to said axis of the first optical fiber, and said second optical fiber having an axis and a lens portion with a graded-index fiber formed integrally in one end of the second optical fiber for receiving light at an angle inclined to said axis of the second optical fiber; and
    a beam splitter or optical filter mounted on said substrate at a position between an extension of said axis of said first optical fiber and an extension of said axis of said second optical fiber, for receiving light emitted along a first optical path from said lens portion of said first optical fiber and for reflecting a portion of said light along a second optical path to said lens portion of said second optical fiber;
    wherein said first optical path and said second optical path are through space.

2. The optical monitor module of claim 1, wherein an end face of said lens portion of each of said first and second optical fibers is angled.

3. The optical monitor module of claim 1, wherein said positioning structure includes first and second grooves of the same shape and the same depth formed in said one surface of said substrate, for positioning said first and second optical fibers disposed in said first and second grooves, respectively.

4. The optical monitor module of claim 3, wherein said first and second grooves are V-grooves.

5. The optical monitor module of claim 3, wherein said substrate has formed in said one surface three or more parallel grooves of the same shape and the same depth, two of said three or more grooves being said first and second grooves.

6. The optical monitor module of claim 1, wherein said first optical path and said second optical path intersect at a straight line extending intermediately between extensions of said axis of the first optical fiber and said axis of the second optical fiber.

7. The optical monitor module of claim 6, wherein said straight line is a line located centrally between the extensions of the axes of said first and second optical fibers.

8. The optical monitor module of claim 1 that comprises an optical part, wherein said beam splitter or optical filter transmits a part of the light received from the first optical path to said optical part.

* * * * *

UNITED STATES PATENT AND TRADEMARK OFFICE
CERTIFICATE OF CORRECTION

PATENT NO. : 7,111,993 B2  Page 1 of 1
APPLICATION NO. : 10/803359
DATED : September 26, 2006
INVENTOR(S) : Keiichi Mori It is certified that error appears in the above-identified patent and that said Letters Patent is hereby corrected as shown below:

Title Page, at INID code (73) Assignee:

"Japan Aviation Electronics Industry Limitede"

should be

-- Japan Aviation Electronics Industry Limited --

Signed and Sealed this

Fourth Day of March, 2008

JON W. DUDAS
*Director of the United States Patent and Trademark Office*